United States Patent [19]
Arai et al.

[11] Patent Number: 6,140,739
[45] Date of Patent: Oct. 31, 2000

[54] PARALLEL PLATE TYPE OSCILLATORY GYROSCOPE

[75] Inventors: Fumihito Arai, 5-1, Aoyanagi-cho 6-chome, Chikusa-ku, Nagoya-shi, Aichi-ken 464-0852; Toshio Fukuda, 66, Yada-cho 2-chome, Higashi-ku, Nagoya-shi, Aichi-ken 461-0042; Koichi Itoigawa; Hitoshi Iwata, both of Aichi-ken, all of Japan

[73] Assignees: Kabushiki Kaisha Tokai Rika Denki Seisakusho; Fumihito Arai; Toshio Fukuda, all of, Japan

[21] Appl. No.: 09/318,488

[22] Filed: May 25, 1999

[30] Foreign Application Priority Data

May 29, 1998 [JP] Japan .................................. 10-149099

[51] Int. Cl.[7] .................................................. H01L 41/08
[52] U.S. Cl. ...................... 310/321; 73/505; 310/316.01; 310/329
[58] Field of Search ..................................... 310/321, 323, 310/329, 316.01, 317, 319; 73/505

[56] References Cited

U.S. PATENT DOCUMENTS

| | | | |
|---|---|---|---|
| 2,271,200 | 1/1942 | Mason ................................. | 310/321 X |
| 3,531,742 | 9/1970 | Saito et al. ........................... | 310/321 X |
| 5,049,776 | 9/1991 | Ogawa .................................. | 73/505 X |
| 5,166,571 | 11/1992 | Konno et al. ........................ | 310/321 X |
| 5,912,524 | 6/1999 | Ohnishi et al. ........................ | 310/321 |

*Primary Examiner*—Mark O. Budd
*Attorney, Agent, or Firm*—Robert D. Buyan; Stout, Uxa, Buyan & Mullins, LLP

[57] ABSTRACT

An oscillatory gyroscope having an improved detecting sensitivity. The oscillatory gyroscope includes an elastic metal body in the form of a rectangular column having first to fourth surfaces. The elastic metal body includes a distal portion having a distal through hole extending from the second surface to the fourth surface and a proximal portion having a second through hole extending from the first surface to the third surface. Two first ferroelectric substance films are provided on the first and third surfaces in the distal portion. Two second ferroelectric substance films are provided over the second and fourth surfaces in the proximal portion. First and second electrodes are provided on each of the first ferroelectric substance films, and third and fourth electrodes are provided on the respective second ferroelectric substance films. Voltages of reverse polarities are applied to the first and second electrodes. The positions of the first and second electrodes on the first surface are reversed with respect to those of the third surface.

10 Claims, 8 Drawing Sheets

◨: Elongation (strettch)

◪: Contraction (compression)

PARALLEL PLATE TYPE OSCILLATORY GYROSCOPE

BACKGROUND OF THE INVENTION

The present invention relates to a parallel plate type oscillatory gyroscope, and more particularly, to a parallel plate type oscillatory gyroscope with a high detecting sensitivity.

Examples of conventional oscillatory gyroscopes includes a tuning-fork type gyroscope shown in FIG. 1 and a vibrating reed type gyroscope shown in FIG. 2.

As shown in FIG. 1, the tuning-fork type oscillatory gyroscope 21 includes a pair of driving piezoelectric ceramic plates 23, both base ends of which are connected to each other through a connection plate 22. The piezoelectric ceramic plates 23 are parallel to each other and their planes are normal to the X-axis, as shown in FIG. 1. A pair of detection piezoelectric ceramic plates are located on centers of the distal ends of the piezoelectric ceramic plates 23, respectively. The piezoelectric ceramic plates 24 are aligned in a plane normal to the Y-axis, which is perpendicular to the x-axis, as shown in FIG. 1. The piezoelectric ceramic plates 23 are applied with alternating voltage to vibrate in the positive and negative directions of the X-axis. If rotation about the Z-axis is imparted to the oscillatory gyroscope 21 the piezoelectric ceramic plates 24 distort and produce a voltage. Detection of this voltage permits a force acting on the piezoelectric ceramic plates 24, or, a Coriolis force Fc, to be sensed. The Coriolis force Fc is generally represented by the following formula (1):

$$Fc = 2\, mV \times \omega \tag{1}$$

where m indicates the mass of the oscillatory gyroscope 21; V the vibrational speed; and ω the angular velocity of the oscillatory gyroscope 21 about the Z-axis.

As shown in FIG. 2, a vibrating reed type oscillatory gyroscope 25 includes a vibrating reed type vibrator 26 in the form of a rectangular column, which is preferably made of a constant elasticity metal. Adhered to a pair of adjacent side faces of the vibrating reed type vibrator 26 are a pair of driving piezoelectric ceramic plates 27 (only one of them being shown in FIG. 2), respectively. Adhered to the remaining side faces are a pair of detection piezoelectric ceramic plates 28, respectively (only one of them being shown in FIG. 2). An alternating voltage is applied to the piezoelectric ceramic plates 27 to vibrate the vibrating reed type vibrator 26 in the positive and negative directions of the X-axis. When rotation about the Z-axis is imparted to the oscillatory gyroscope 26, the piezoelectric ceramic plates 28 distort and produce a voltage.

The piezoelectric ceramic plates 23, 24, 27 and 28 are formed from bulk PZT (lead zirconate titanate, or ceramics comprising a solid solution of lead titanate and lead zirconate). However, it is difficult to form bulk PZT into thin plates, so it is difficult to reduce the size of the oscillatory gyroscope.

Additionally, adhering the piezoelectric ceramic plates 27, 28 to the vibrator 26 increases the number of manufacturing steps, and generates dispersion in the detecting sensitivity due to adhesion accuracy, or, positional accuracy.

The Coriolis force Fc increases, as shown by the formula (1), in proportion to the mass m of the oscillatory gyroscope. As a result, as the mass m increases, the detection piezoelectric ceramic plates 24, 28 increase in amount of distortion, which improves the detecting sensitivity. To increase the mass of the oscillatory gyroscope, it is preferred to increase the amount of the base material for the bulk PZT. However, there is a limit in increasing the amount of the bulk PZT.

Further, the Coriolis force Fe increases in proportion to the vibrating speed V. As a result, the detecting sensitivity is improved. In order to increase the vibrating speed, it is preferred in the tuning-fork type oscillatory gyroscope to make the base material for the bulk PZT thinner. However, when made thinner, the piezoelectric ceramic plates 23 lose rigidity and become easy to distort. This distortion makes it difficult to obtain accurate vibrations on the piezoelectric ceramic plates 23 and is added to the distortion of the detection piezoelectric ceramic plates 24, which makes detection of voltage difficult.

An object of the present invention is to provide an oscillatory gyroscope having an improved detecting sensitivity.

SUMMARY OF THE INVENTION

In one aspect of the present invention, an oscillatory gyroscope is provided that includes an elastic metal body in the form of a rectangular column having first to fourth surfaces. The first and third surfaces are opposite, and the second and fourth surfaces are opposite. The elastic metal body includes a distal portion having a distal through hole extending from the second surface to the fourth surface and a proximal portion having a second through hole extending from the first surface to the third surface. Two first ferroelectric substance films are provided on the first and third surfaces in the distal portion. Two second ferroelectric substance films are provided over the second and fourth surfaces in the proximal portion. First and second electrodes are provided on each of the first ferroelectric substance films, and third and fourth electrodes are provided on the respective second ferroelectric substance films. Voltages of reverse polarities are applied to the first and second electrodes. The positions of the first and second electrodes on the first surface are reversed with respect to those of the third surface.

In another aspect of the present invention, an oscillatory gyroscope apparatus is provided that includes an oscillatory gyroscope. The gyroscope includes an elastic metal body in the form of a rectangular column having first to fourth surfaces. The first and third surfaces are opposite, the second and fourth surfaces are opposite. The elastic metal body includes a distal portion having a distal through hole extending from the second surface to the fourth surface and a proximal portion having a proximal through hole extending from the first surface to the third surface. Two first ferroelectric substance films are provided on the first and third surfaces in the distal portion. Two second ferroelectric substance films are provided on the second and fourth surfaces in proximal portion. First and second electrodes are provided on each of the first ferroelectric substance films, and third and fourth electrodes provided on each of the second ferroelectric substance films. Voltages of reverse polarities are applied to the first and second electrodes. The positions of first and second electrodes are reversed with respect to those of the third surface. The apparatus includes an oscillation circuit for generating an oscillation signal having a predetermined frequency. A reverse amplification circuit is connected to the oscillation circuit for reversing the oscillation signal and for generating a reverse voltage signal. The voltage signal is applied to the third electrodes. A non-reverse amplification circuit is connected to the oscillation circuit for generating a voltage signal based on the oscillation signal. The voltage signal is applied to the fourth electrodes. A first differential circuit is connected to the first electrode of the first surface and the second electrode of the third surface. The first differential circuit receives first piezoelectric signals generated by deformation of portions of the first ferroelectric substance films that correspond to the first and second electrodes that are connected to the first differential circuit. The first differential circuit generates a first differential voltage signal representing the difference of the first piezoelectric signals. A second differential circuit is connected to the second electrode of the first surface and the first electrode of the third surface. The second differential circuit receives second piezoelectric signals generated by deformation of portions of the first ferroelectric substance films that correspond to the first and second electrodes that are connected to the second differential circuit. The second differential circuit generates a second differential voltage signal representing the difference of the second piezoelectric signals. An adder is connected to the first and second differential circuits for adding the first and second differential voltage signals and generating a detection signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
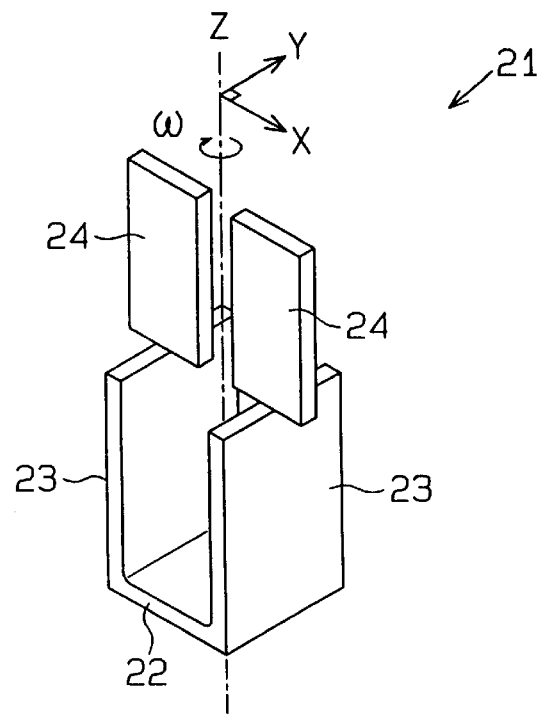
FIG. 1 is a diagrammatic perspective view of a first conventional oscillatory gyroscope.
Figure 2:
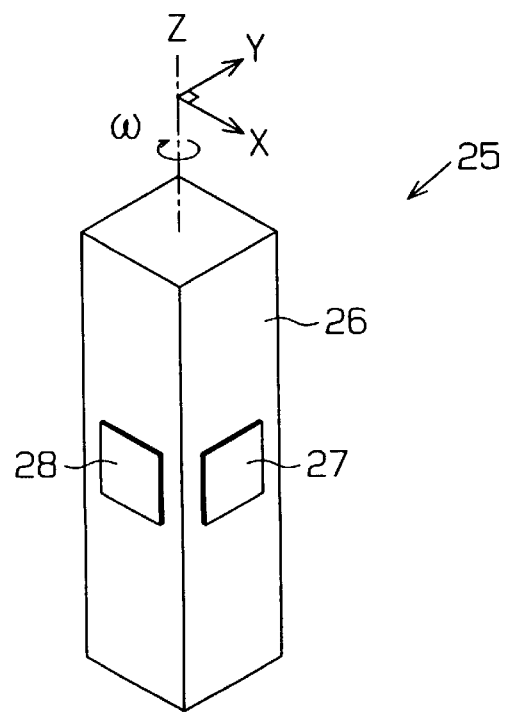
FIG. 2 is a diagrammatic perspective view of a second conventional oscillatory gyroscope.
Figure 3:
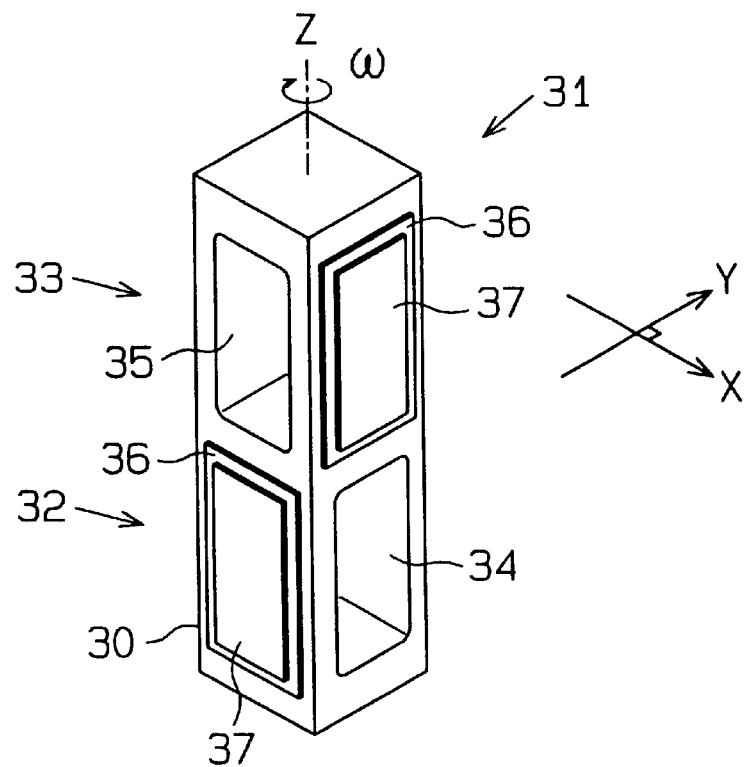
FIG. 3 is a diagrammatic perspective view of an oscillatory gyroscope according to a first embodiment of the present invention.
Figure 4:
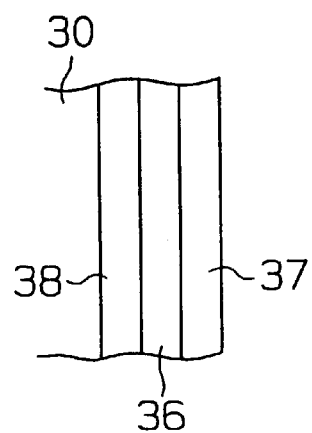
FIG. 4 is an enlarged side view of a part of the oscillatory gyroscope of FIG. 3.

FIG. 3 shows an oscillatory gyroscope 31 according to a first embodiment of the present invention. The oscillatory gyroscope 31 comprises an elastic metal body 30 in the form of a rectangular column. The metal body 30 includes through holes 34, 35 formed in upper and lower portions of the metal body 30, the axes of which are at right angles. The through hole 34 defines a first parallel plate portion 32, which includes two parallel side walls, and the through hole 35 defines a second parallel plate portion 33, which includes two parallel side walls. The first parallel plate portion 32 and the second parallel plate portion 33 have, at their outer wall surfaces, a titanium film 38 (see FIG. 4) and a PZT thin film 36, which is formed on the titanium film 38. The first parallel plate portion 32 serves as a driving unit for application of vibration, and the second parallel plate portion 33 serves as a detection unit.

Formed on the PZT thin film 36 is a flat plate electrode 37, which is somewhat smaller than the PZT thin film 36, and preferably includes aluminum. Application of a voltage to the electrode 37 of the first parallel plate portion 32 vibrates the first parallel plate portion 32. A voltage generated on the PZT thin film 36 is detected at the electrode 37 of the second parallel plate portion 33.

The oscillatory gyroscope 31 according to the first embodiment includes the first and second parallel plate portions 32, 33, which are formed by the perpendicular through holes 34, 35. The first and second parallel plate portions 32, 33 provide an oscillatory gyroscope 31 that is resistant to distortion. Accordingly, the first parallel plate portion 32 vibrates precisely and the second parallel plate portion 33 is precisely displaced. Thus, the oscillatory gyroscope 31 has an improved noise resistance and an improved detecting sensitivity.

Figure 5:
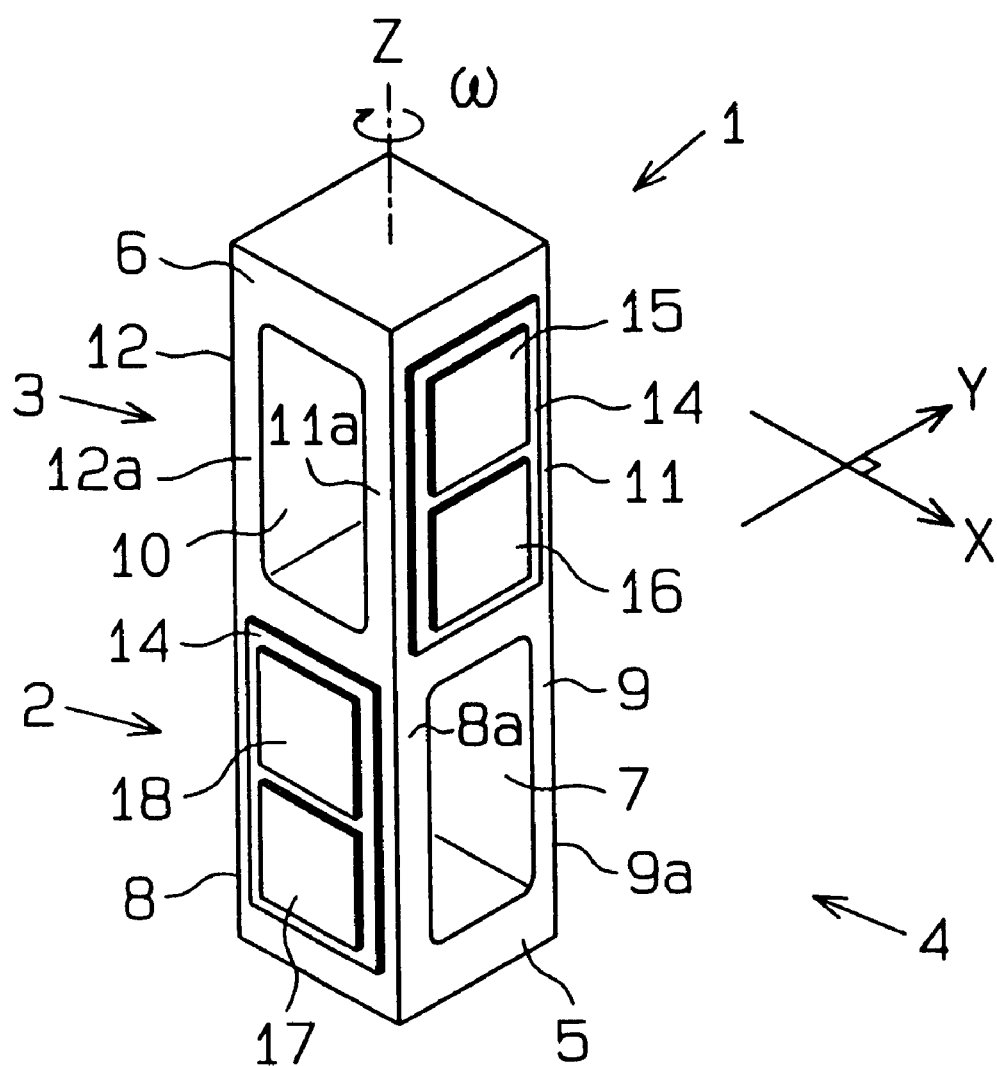
FIG. 5 is a diagrammatic perspective view of an oscillatory gyroscope according to a second embodiment of the present invention.

FIG. 5 shows an oscillatory gyroscope 1 according to a second embodiment of the present invention. The oscillatory gyroscope 1 includes a base material 4 in the form of a rectangular column and is preferably made of stainless steel, which is an elastic metal. Preferably, the base material 4 has a square cross-section. The lower end of the base material 4 is stationary, or fixed, and the upper end of the base material 4 is free, or unsupported. The base material 4 includes a first surface 5, which faces the positive direction of the X-axis, a second surface 6 adjacent to the first surface 5 in a clockwise direction, a third surface 105 adjacent to the second surface 6, and a fourth surface 106, which is adjacent to the third surface 105 (see FIG. 6). The first surface 5 and the third surface 105 are opposite to one another, and the second surface 6 and the fourth surface 106 are opposite to one another (only the first and second surfaces 5 and 6 are shown in FIG. 5).

The base material 4 includes a through hole 10 formed at the distal end of the column. The through hole 10 extends from the second surface 6 to the fourth surface 106. Another through hole 7 is formed at the proximal end of the column and extends from the first surface 5 to the third surface 105. Accordingly, the axis of the through holes 7, 10 are substantially perpendicular to each other. The through holes 7, 10 are preferably rectangular. The through holes 7, 10 are shown as being parallel to each other in the oscillatory gyroscope 1 shown in FIG. 6 for purpose of illustration. However, the through holes 7, 10 are substantially perpendicular to each other as shown in FIG. 5.

A pair of parallel side plates 8, 9 form the walls of the through holes 7 at the lower, or proximal portion of the base material 4. The other surface of one of the side plates 8 defines the second surface 6, and the other surface of the other side plate 9 defines the fourth surface 106. The side plates 8, 9 includes thin walled portions 8a, 9a, respectively preferably have a thickness of about 200 μm. The side plates 8, 9 and the through hole 7 defined the parallel plate portion 2, which serves as a drive section and is located at lower, or proximal end of the base material 4.

A pair of parallel side plates 11, 12 form the walls of the through hole 10 at the upper, or distal portion of the base material 4. The outer surface of one of the side plates 11 defines the first surface 5, and the outer surface of the other side plate 12 defines the fourth surface 106. The side plates 11, 12 include thin walled portions 11a, 12a, which preferably have a thickness of about 200 μm. The thin walled portions 8a, 9a, 11a, 12a preferably have uniform thicknesses. The side plates 11, 12 and the through hole 10 define the parallel plate portion 3, and is located at the upper, or distal end, of the base material 4. Accordingly, the side plates 8, 9 of the proximal parallel plate portion 2 are perpendicular to the side plates 11, 12 of the distal parallel plate portion 3.

Figure 9:
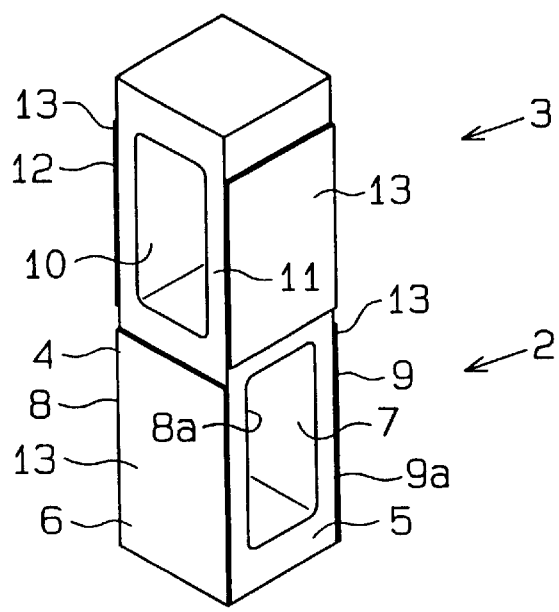

The titanium film 13 is on the second surface 6 and the fourth surface 106 in the proximal parallel plate portion 2 (see FIG. 9). Further, a titanium film 13 is provided on the first surface 5 and the third surface 105 in the parallel plate portion 3. The titanium film 13 is formed preferably by means of sputtering to function as a base face. A PZT thin film 14 (see FIG. 10), which has a thickness of 20 to 30 μm, is applied over the entire surfaces of the titanium film 13. The PZT thin film 14 comprises ferroelectric film.

Figure 6:
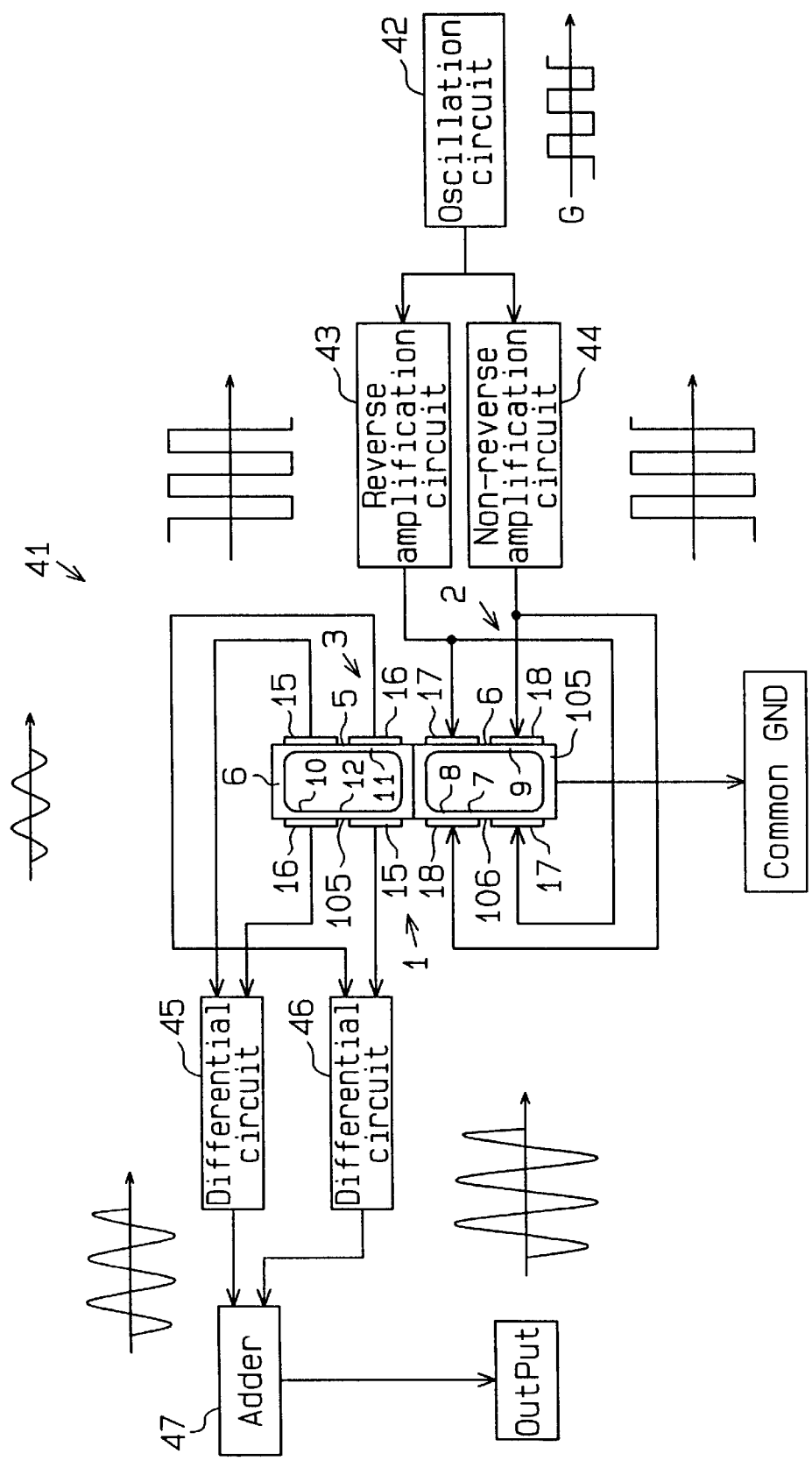
FIG. 6 is a diagrammatic block diagram of an apparatus including the oscillatory gyroscope of FIG. 5.

As shown in FIGS. 5 and 6, a first electrode film 15 and a second electrode film 16 are located on the respective PZT thin films 14 on the first and third surfaces 5 and 105 in the distal parallel plate portion 3 at predetermined intervals along the Z-axis (only the first surface 5 is shown in FIG. 5). The first and second electrode films 15 and 16 are preferably made of aluminum and have a thickness of about 1 to 2 μm. Preferably, the first and second electrode films 15 and 16 have substantially the same area. On the third surface 105, the positions of the first and second electrode films 15 and 16 are reversed from those of the first surface 5 (see FIG. 6).

Figure 11:
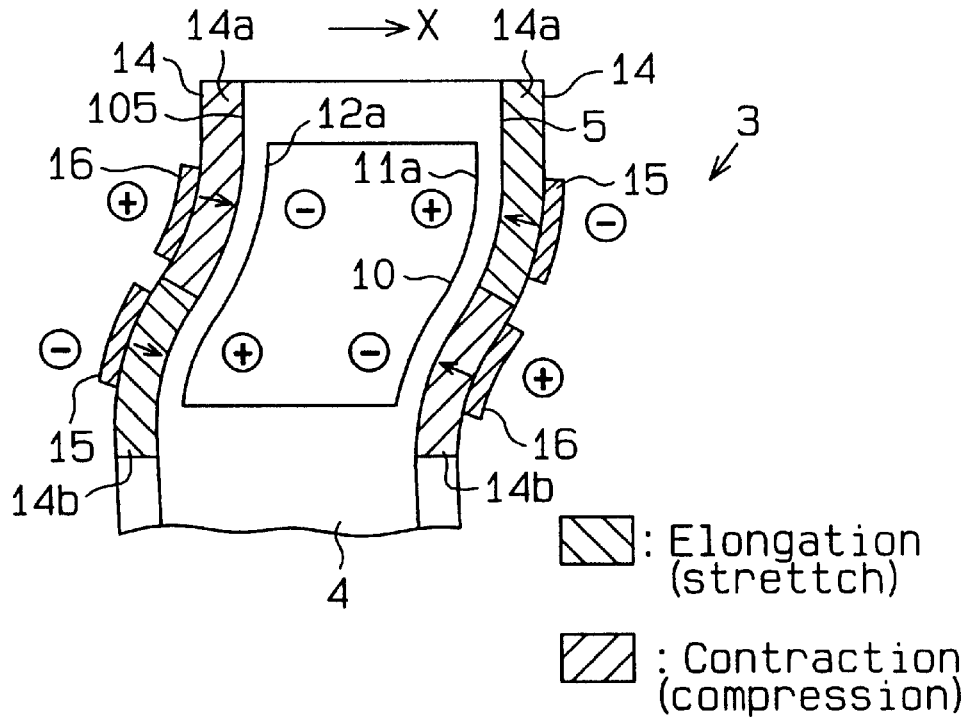
FIGS. 11 and 12 are a diagrammatic views illustrating motion of the oscillatory gyroscope of FIG. 5.

As shown in FIG. 11, for example, in the case where the distal parallel plate portion 3 deforms in the X-axis (rightward in FIG. 11), the distal portion 14a of the PZT thin film 14 on the first surface 5 elongates while a proximal portion 14b of the PZT thin film on the first surface 5 contracts. On the contrary, a distal portion 14a of the PZT thin film 14 on the third surface 105 contracts while a proximal portion 14b of the PZT thin film on the third surface 105 elongates. The positions of the first electrode film 15 and the second electrode film 16 correspond to the distal portion 14a and proximal portion 14b of the PZT thin film 14, respectively, where elongation and contraction occur. Accordingly, piezoelectric signals generated by elongation and contraction of the PZT thin film 14 are obtained from the first and second electrode films 15 and 16. As a result, the sensitivity of the oscillatory gyroscope 1 is improved. In FIG. 11, arrows in the PZT thin film 14 indicate a direction of polarization of the PZT thin film 14.

Referring again to FIGS. 5 and 6, a third electrode film 17 and a fourth electrode film 18 are applied on the PZT thin films 14 on the second surface 6 and the fourth surface 106 on the proximal parallel plate portion 2 at predetermined intervals along the z-axis (only the second surface 6 is shown in FIG. 5). The third and fourth electrodes films 17 and 18 are preferably made of aluminum and have a thickness of about 1 to 2 μm. Preferably, each of the third and fourth electrode films 17 and 18 have substantially the same area. On the fourth surface 106, the positions of third and fourth electrode films 17 and 18 are reversed form those of the second surface 6 (see FIG. 6). Thus, voltage of opposite polarities are applied to the third and fourth electrode films 17 and 18. Accordingly, the distal portion of the PZT thin film 14 on the second surface 6 and the proximal portion of the PZT thin film 14 on the fourth surface 106 deform in the same manner. Likewise, the proximal portion of the PZT thin film 14 on the second surface 6 and the distal portion of the PZT thin film 14 on the fourth surface 106 deform in the same manner. Thus, deformation of the PZT thin film 14 effectively drives the parallel plate portion 2.

A method of manufacturing the oscillatory gyroscope 1 will be described with reference to FIGS. 7 to 10.

Figure 7:
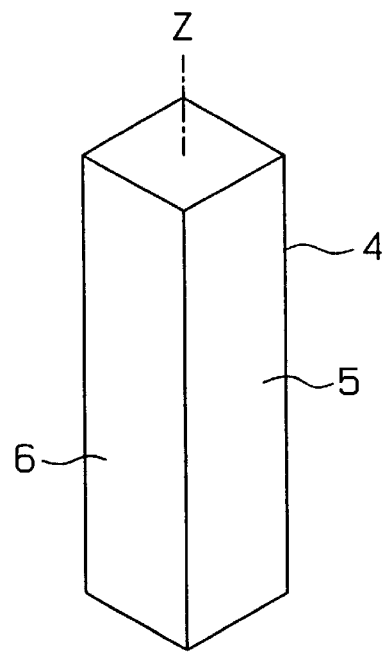
FIGS. 7 through 10 are a diagrammatic perspective views showing a manufacturing process of the oscillatory gyroscope of FIG. 5.
Figure 8:
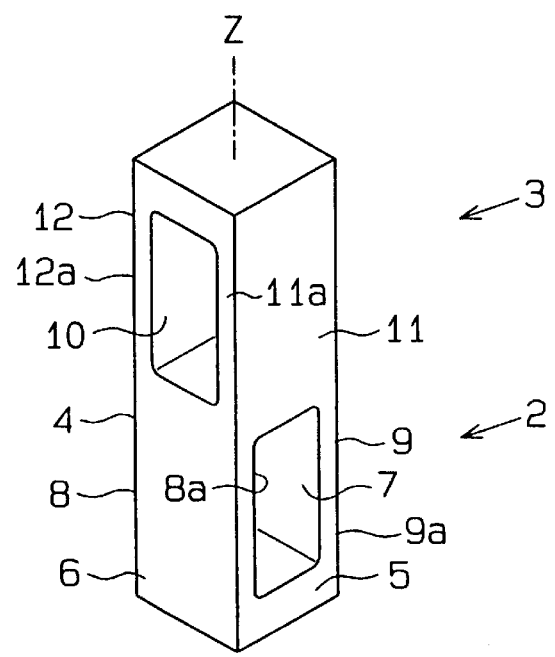

FIG. 7 shows a base material 4 in the form of a rectangular column having a square cross-section. The base material 4 is preferably made of stainless steel. As shown in FIG. 8, perpendicular through holes 7, 10 are formed in proximal (lower) and distal (upper) portions of the base material 4, respectively, by means of cutting or etching. The proximal through hole 7 defines a pair of proximal parallel plates 8, 9 in the proximal portion of the base material 4. The side plates 8, 9 and the through hole 7 defined a proximal parallel plate portion 2. Also, the distal through hole 10 forms a pair of distal parallel plates 11, 12 on the distal portion of the base material 4. The distal parallel plates 11, 12 and the distal through hole 10 define a distal parallel plate portion 3.

Then, the base material 4 is cleaned, preferably by acids, and a mask made of metal other than titanium is formed on the entire surface of the base material 4, except portions where the PZT thin film 14 is to be formed. The mask can be formed by a synthetic resin or a physical film forming method such as sputtering, vacuum deposition or the like.

Next, as shown in FIG. 9, titanium films 13 are formed on the second and fourth surfaces 6 and 106 in the proximal parallel plate portion 2 and on the first and third surfaces 5 and 105 in the distal parallel plate portion 3. The titanium films 13 can be formed by means of a physical film forming method such as sputtering, vacuum deposition or the like. Subsequently, PZT thin films 14 are formed on the titanium films 13 preferably by means of the hydrothermal method. The hydrothermal process has two stages.

First Stage

The base material 4, an aqueous solution of zirconium oxychloride ($ZrOCl_2 \cdot 8H_2O$) and lead nitrate ($Pb(NO_3)_2$), and a solution of KOH (8N) are placed in a Teflon container (not shown) and the mixture is agitated. Adjustment of the molar ratio of zirconium oxychloride and lead nitrate determines a piezoelectric characteristic of the PZT thin film 14. That is, adjustment of the molar ratio determines a composition ratio of lead titanate and lead zirconate contained in the PZT thin film 14.

Then, the base material 4 is fixed in a pressure vessel (not shown), and the aqueous solution of zirconium oxychloride ($ZrOCl_2 \cdot 8H_2O$) and lead nitrate ($Pb(NO_3)_2$) and the solution of KOH (8N) are heated and pressurized while being agitated. Pressurization is effected by vapor pressure of the heated solution. The temperature is 150° C., the duration of heating and pressurization is 48 hours, and agitation is performed at 300 rpm. As a result, seed crystals (nuclei) of PZT are formed on the surface of the titanium films 13 on the distal and proximal parallel plate portions 2, 3 under supersaturation. After the elapse of a predetermined period of time, the base material 4 is taken out of the pressure vessel to be water-washed and dried.

Second Stage

Then, the base material 4, on which seed crystals are formed, the aqueous solution of zirconium oxychloride ($ZrOCl_2 \cdot 8H_2O$) and lead nitrate ($Pb(NO_3)_2$), and a solution of titanium tetrachloride ($TiCl_4$) and KOH (4N) are placed in a Teflon container (not shown) and the mixture is agitated. Adjustment of the molar ratio of zirconium oxychloride, titanium tetrachloride and lead nitrate determines a piezoelectric characteristic of the PZT thin film 14. That is, adjustment of the molar ratio determines the composition ratio of lead titanate and lead zirconate contained in the PZT thin film 14.

Figure 10:
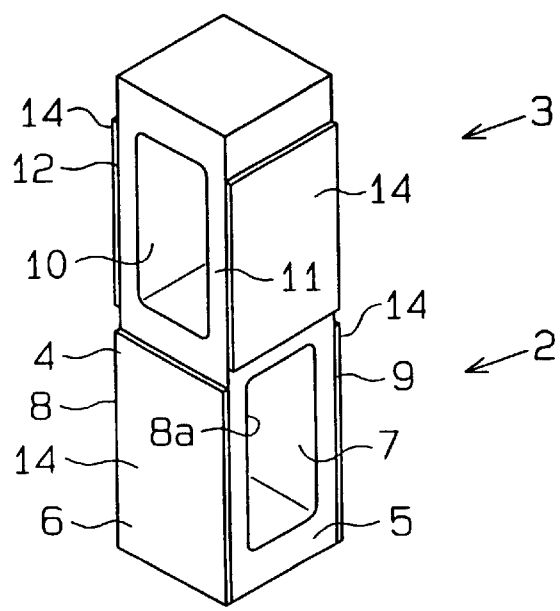

Then, the base material 4 is fixed in a pressure vessel (not shown), and the aqueous solution of zirconium oxychloride ($ZrOCl_2 \cdot 8H_2O$) and lead nitrate ($Pb(NO_3)_2$) and the solution of titanium tetrachloride ($TiCl_4$) and KOH (4N) are heated and pressurized while being agitated. The temperature is 120° C., the duration of heating and pressurized is 48 hours, and the agitation is performed at 300 rpm. As a result, a PZT thin film 14 having a predetermined thickness is formed on the surface of the titanium film 13 on the proximal and distal parallel plate portions 2, 3 under supersaturation as shown in FIG. 10. After the elapse of a predetermined period of time, the base material 4 is taken out of the pressure vessel to be water-washed and dried. Thereafter, the mask is removed.

Then, an aluminum layer is formed on the surface of the PZT thin film 14 by means of a physical film forming method such as sputtering, vacuum deposition or the like, and, then, the pairs of the electrode films 15, 16, 17 and 18 are formed by removing unnecessary portions of the aluminum layer by patterning. In this manner, an oscillatory gyroscope 1 is formed. Thereafter, lead wires are attached to the electrode films 15, 16, 17 and 18 by soldering.

FIG. 6 is a diagrammatic block diagram of an oscillatory gyroscope apparatus 41 that includes the oscillatory gyroscope 1. The oscillatory gyroscope apparatus 41 has an oscillation circuit 41, which generates a voltage signal having a predetermined frequency and feeds the voltage signal to a reverse amplification circuit 43 and a non-reverse amplification circuit 44. The reverse amplification circuit 43 effects reverse amplification of the voltage signal, which in turn is applied to the third electrode film 17 of the oscillatory gyroscope 1. The non-reverse amplification circuit 44 amplifies the voltage signal, and applies the amplified voltage signal to the fourth electrode film 18 of the oscillatory gyroscope 1. The base material 4 of the oscillatory gyroscope 1 is grounded.

In the distal parallel plate portion 3, the distal set of first and second electrode films 15 and 16, which are provided on opposite surfaces, are connected electrically to a first differential circuit 45. Upon receiving piezoelectric signals from the first and second electrode films 15 and 16, the first differential circuit 45 amplifies the difference between the piezoelectric signals twice and generates a first piezoelectric signal.

The proximal set of first and second electrode films 15 and 16, which are provided on opposite surfaces, are connected electrically to a second differential circuit 46. Upon receiving piezoelectric signals from the first and second electrode films 15 and 16, the second differential circuit 46 amplifies the difference between the piezoelectric signals twice and generates a second piezoelectric signal.

After receiving first and second piezoelectric signals from the first and second differential circuits 45 and 46, an adder 47 adds the first and second piezoelectric signals to generate a quadruple piezoelectric signal while making the first and second piezoelectric signals consistent in polarity with each other.

In the use of the oscillatory gyroscope apparatus 41, the reverse and non-reverse amplification circuits 43 and 44 apply alternating voltages to the two electrode films 17 and 18 on the proximal parallel plate portion 2 with the base material 4 fixed. Then, the distal and proximal portions of the PZT thin film 14 on the second surface 6 are made to alternately contract and elongate. Also, the distal and proximal portions of the PZT thin film 14 on the fourth surface 106 are made to alternately contract and elongate. More specifically, when the direction of polarization of the PZT thin film 14 is directed toward the base material 4 from the electrode films 17 and 18, the PZT thin film 14, to which a positive potential is applied, contracts, and the PZT thin film 14, to which a negative potential is applied, elongates. As a result, the proximal parallel plate portion 2 is driven, and the distal parallel plate portion 3 is made to vibrate in the Y-axis of FIG. 5. When rotation of angular velocity ω about the Z axis is imparted to the oscillatory gyroscope 1 in this state, the PZT thin film 14 on one of the surfaces of the distal parallel plate portion 3 contracts, and the PZT thin film 14 on the opposite surface of the distal parallel plate portion 3 elongates. As shown in FIG. 11, when the distal parallel plate portion 3 deforms in the x-axis (rightward in FIG. 11), the distal portion 14a of the PZT thin film 14 on the first surface 5 elongates while the proximal portion 14b contracts. Meanwhile, the distal portion 14a of the PZT thin film 14 on the third surface 105 contracts, while the proximal portion 14b elongates. Two sets of piezoelectric signals of the PZT thin film 14 caused by this contraction and elongation are fed to the first and second differential circuits 45, 46. Also fed to the first and second differential circuits 45, 46 are leakage voltages of voltage signals from the reverse and non-reverse amplification circuits 43 and 44 and noises.

A detection signal G1 outputted from the first electrode film 15 is represented as follows:

$$G1 = M + N - A$$

where M is the leakage, N is the noise, and A is the piezoelectric voltage signal.

In addition, the sign (plus or minus) of the piezoelectric signal A depends upon the direction of polarization of the PZT thin film 14.

Further, a detection signal G2 outputted from the second electrode film 16 is represented as follows:

$$G2 = M + N + A$$

Each of the first and second differential circuits 45, 46 amplifies a difference (G2−G1) between the detection signals G1, G2 to generate piezoelectric signals. The adder 47 adds the first and second piezoelectric signals and generates a piezoelectric signal. Based on such piezoelectric signal, the Coriolis force acting on the oscillatory gyroscope 1 is detected. Further, an angular velocity ω is calculated from the Coriolis force Fc, the mass m of the oscillatory gyroscope 1 and the vibrating speed V.

The second embodiment of the present invention has the following features.

(1) An explanation will be given regarding the piezoelectric signal A generated when the force F is applied on the PZT thin film 14.

Figure 13:
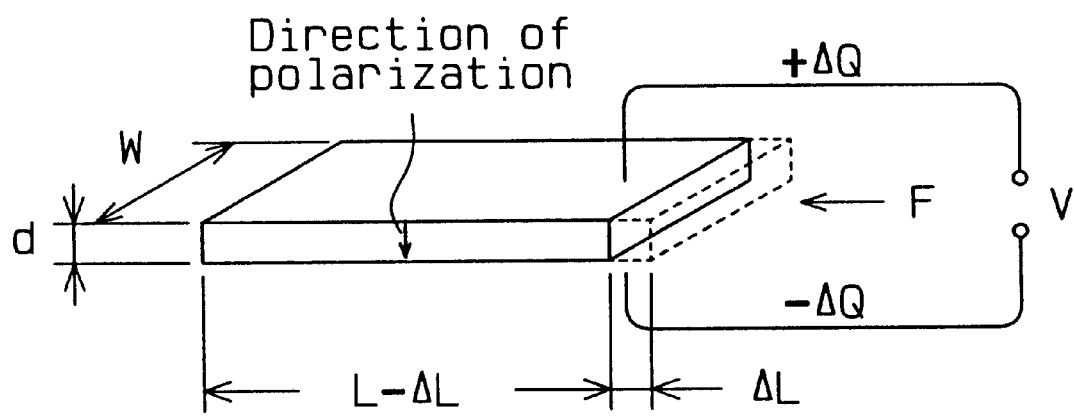
FIG. 13 is a diagrammatic view illustrating a voltage generated on the PZT thin film.

FIG. 13 shows a PZT thin film having a film thickness d, a length L and a width W. When a force F is applied endwise on the PZT thin film, the length L of the PZT thin film diminishes to a length (L−ΔL). At this time, electric charges +ΔQ and −ΔQ are generated on the front and back surfaces of the PZT thin film depending upon the direction of polarization. Accordingly, a voltage A generated on the PZT thin film is obtained from the following formula (2):

$$A = \Delta Q/C \quad (\text{C indicates electric capacitance.}) \quad (2)$$

Since $C=(S \cdot \epsilon 0 \cdot \epsilon r)/d$ ($\epsilon 0$ indicates a vacuum dielectric constant, $\epsilon I$ indicates a specific inductive capacity of the PZT thin film, and S indicates an area (W×L) of the PZT thin film), the voltage A generated is obtained from the following formula (3):

$$A = (\Delta Q \cdot d)/(S \cdot \epsilon 0 \cdot \epsilon r) \quad (3)$$

Accordingly, the smaller the area of the PZT thin film, the greater the voltage A generated.

In the second embodiment, a relatively great generated voltage A is obtained since the first and second electrode films 15, 16 separate from each other on the distal parallel plate portion 3 and are relatively small in area.

(2) As shown in FIG. 6, the positions of first and second electrode films 15, 16 are reversed on the first surface 5 compared to those of the third surface 105. Accordingly, for example, as shown in FIG. 11, voltage signals A are output from the two first electrode films 15 in accordance with elongations of the distal portion 14a of the PZT thin film 14 on the first surface 5 and of the proximal portion 14b of the PZT thin film 14 on the third surface 105. Further, voltage signals A are output from the two first electrode films 16 in accordance with contractions of the proximal portion 14b of the PZT thin film 14 on the first surface 5 and of the distal portion 14a of the PZT thin film 14 on the third surface 105.

(3) As shown in FIG. 6, positions of the third and fourth electrode films 17, 18 are reversed on the second surface 6 compared to those of the fourth surface 106. When voltages of reverse polarities are applied to the third and fourth electrode films 17, 18, a portion of the PZT thin film 14 corresponding to the third electrode film 17 contracts (or elongates), and the remaining portion of the PZT thin film 14 corresponding to the fourth electrode film 18 elongates (or contracts). Accordingly, the proximal parallel plate portion 2 deforms efficiently because a portion of the PZT thin film 14 elongates and the opposite, remaining portion of the PZT thin film 14 contracts.

(4) The adder 47 adds a two-fold differential voltage signal supplied from the first differential circuit 45 and a two-fold differential signal supplied from the second differential circuit 46 and generates a four-fold piezoelectric signal. Accordingly, the oscillatory gyroscope apparatus 41 outputs a relatively great piezoelectric signal. As a result, the detection sensitivity oscillatory gyroscope 1 is improved.

(5) Because the PZT thin film 14, which has a thickness of about 20 to 30 $\mu$m, is provided on the surfaces of the titanium film 13 of the parallel plate portions 2, 3, the oscillatory gyroscope 1 is relatively small.

(6) After the hydrothermal method was used to form the titanium film 13 on the outer surfaces of the base material 4, the hydrothermal method was used to form the PZT thin film 14 on the titanium film 13 and further the electrode films 15, 16, 17, 18 were formed on the PZT thin film 14. As a result, a constant sensitivity of detection is obtained. Because the PZT thin film 14 for driving and the PZT thin film 14 for detection are formed simultaneously by the hydrothermal method, the PZT thin film formation is simplified.

(7) The connection between the proximal and distal parallel plate portions 2, 3 or the distal portion of the base material 4 connecting the side plates 11, 12 on the distal parallel plate portion 3 is usable for adjusting the mass m of the oscillatory gyroscope 1. In other words, the mass m of the oscillatory gyroscope 1 is changed by suitably varying the mass of the connection and of the distal portion of the base material 4. Therefore, it is possible to improve the sensitivity of detection of the oscillatory gyroscope 1 by adjusting the mass m of the oscillatory gyroscope 1.

It should be apparent to those skilled in the art that the present invention may be embodied in many other specific forms without departing from the spirit or scope of the invention. Particularly, it should be understood that the invention may be embodied in the following forms.

Figure 12:
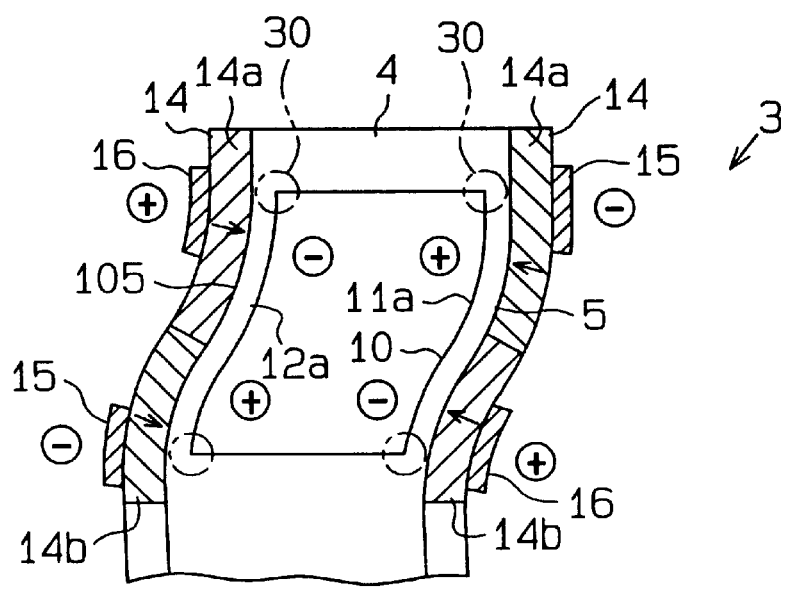

(1) The first and second electrode films 15, 16 may be located at regions 30, which are shown by alternate long and short dash lines in FIG. 12, where the maximum stresses of the base material 4 concentrate. Portions of the PZT thin film 14 corresponding to the regions 30, where the maximum stresses of the base material 4 concentrate, elongate or contract relatively greatly, so that relatively great strains are produced. Accordingly, relatively great piezoelectric voltages are obtained at the regions 30 where the maximum stresses of the base material 4 concentrate.

(2) The electrode films 15 to 18 may be formed from conductive metals such as Au or the like as well as from aluminum.

(3) The electrode films 15 to 18 may be formed by using the screen process printing to print a conductive paste on the PZT thin film 14.

(4) The present invention may be embodied on a tuning-fork type oscillatory gyroscope. In this case, a pair of oscillatory gyroscope 1 are secured to both ends of the connection plates to thereby form a tuning-fork type oscillatory gyroscope.

(5) The base material 4 may be of metals other than stainless steel such as titanium or the like. If the base material 4 is made of titanium, formation of the titanium film 13 is dispensed with.

Therefore, the present examples and embodiment are to be considered as illustrative and not restrictive and the invention is not to be limited to the details given herein, but may be modified within the scope and equivalence of the appended claims.

What is claimed is:

1. An oscillatory gyroscope comprising:
   an elastic metal body in the form of a rectangular column having first to fourth surfaces, the first and third surfaces being opposite, the second and fourth surfaces being opposite, the elastic metal body including a distal portion having a distal through hole extending from the second surface to the fourth surface and a proximal portion having a second through hole extending from the first surface to the third surface;
   two first ferroelectric substance films provided on the first and third surfaces in the distal portion;
   two second ferroelectric substance films provided over the second and fourth surfaces in the proximal portion;
   first and second electrodes provided on each of the first ferroelectric substance films, wherein voltages of reverse polarities are applied to the first and second electrodes; and
   third and fourth electrodes provided on the respective second ferroelectric substance films,
   wherein the positions of the first and second electrodes on the first surface are reversed with respect to those of the third surface.

2. The oscillatory gyroscope according to claim 1, wherein voltages of reverse polarities are applied to the third and fourth electrodes, and wherein the positions of the third and fourth electrodes on the second surface are reversed with respect to those of the fourth surface.

3. The oscillatory gyroscope according to claim 1, wherein the first and second electrodes are provided on portions of the first ferroelectric substances films where stresses concentrate when the elastic metal body deforms.

4. The oscillatory gyroscope according to claim 1, wherein the elastic metal body is made of titanium, and the two first ferroelectric substance films comprise PZT thin films provided directly on the first and third surfaces and wherein the two second ferroelectric substance films comprise PZT thin films provided directly on the second and fourth surfaces.

5. The oscillatory gyroscope according to claim 1, wherein the first and second through holes have rectangular cross-sections.

6. The oscillatory gyroscope apparatus comprising:
   an oscillatory gyroscope, the gyroscope including:
      an elastic metal body in the form of a rectangular column having first to fourth surfaces, the first and third surfaces being opposite, the second and fourth surfaces being opposite, the elastic metal body including a distal portion having a distal through hole extending from the second surface to the fourth surface and a proximal portion having a proximal through hole extending from the first surface to the third surface,
      two first ferroelectric substance films provided on the first and third surfaces in the distal portion,
      two second ferroelectric substance films provided on the second and fourth surfaces in the proximal portion,
      first and second electrodes provided on each of the first ferroelectric substance films, wherein voltages of reverse polarities are applied to the first and second electrodes, and
      third and fourth electrodes provided on each of the second ferroelectric substance films, wherein the positions of first and second electrodes are reversed with respect to those of the third surface;
   an oscillation circuit for generating an oscillation signal having a predetermined frequency;
   a reverse amplification circuit connected to the oscillation circuit for reversing the oscillation signal and for generating a reverse voltage signal, the voltage signal being applied to the third electrodes;
   a non-reverse amplification circuit connected to the oscillation circuit for generating a voltage signal based on the oscillation signal, the voltage signal being applied to the fourth electrodes;
   a first differential circuit connected to the first electrode of the first surface and the second electrode of the third surface, wherein the first differential circuit receives first piezoelectric signals generated by deformation of portions of the first ferroelectric substance films that correspond to the first and second electrodes that are connected to the differential circuit, and the first differential circuit generates a first differential voltage signal representing the difference of the first piezoelectric signals;
   a second differential circuit connected to the second electrode of the first surface and the first electrode of the third surface, wherein the second differential circuit receives second piezoelectric signals generated by deformation of portions of the first ferroelectric substance films that correspond to the first and second electrodes that are connected to the second differential circuit, and the second differential circuit generates a second differential voltage signal representing the difference of the second piezoelectric signals; and
   an adder connected to the first and second differential circuits for adding the first and second differential voltage signals and generating a detection signal.

7. The oscillatory gyroscope apparatus according to claim 6, voltages of reverse polarities are applied to the third and fourth electrodes, and wherein the positions of the third and fourth electrodes on the second surface are reversed with respect to those of the fourth surface.

8. The oscillatory gyroscope apparatus according to claim 6, wherein the first and second electrodes are provided on portions of the first ferroelectric substance films where stresses concentrate when the elastic metal body deforms.

9. The oscillatory gyroscope apparatus according to claim 6, wherein the elastic metal body is made of titanium, and the two first ferroelectric substance films comprise PZT thin films provided directly on the first and third surfaces, and wherein the two second ferroelectric substance films comprise PZT thin films provided directly on the second and fourth surfaces.

10. The oscillatory gyroscope apparatus according to claim 6, wherein the first and second through holes have rectangular cross-sections.

* * * * *